United States Patent [19]
Coltman et al.

[11] Patent Number: 5,253,826
[45] Date of Patent: Oct. 19, 1993

[54] LIGHTWEIGHT SEALED PARACHUTE AND HARNESS ASSEMBLY

[75] Inventors: Joseph W. Coltman, Scottsdale; Kenneth W. Sego, Jr., Phoenix, both of Ariz.

[73] Assignee: Simula Inc., Phoenix, Ariz.

[21] Appl. No.: 818,799

[22] Filed: Jan. 9, 1992

[51] Int. Cl.$^5$ .................. B64D 17/40; B64D 17/64
[52] U.S. Cl. .................. 244/147; 244/148; 244/149; 244/151 B; 244/137.3
[58] Field of Search ............. 244/142, 147, 148, 149, 244/151 A, 151 B, 152, 137.3; 206/524.8

[56] References Cited
U.S. PATENT DOCUMENTS

| | | | |
|---|---|---|---|
| 2,495,341 | 1/1950 | Moran | 244/148 |
| 2,702,679 | 2/1955 | Culver | 244/148 |
| 3,584,815 | 6/1971 | Stencel | 244/149 |
| 3,712,568 | 1/1973 | Grasso et al. | 244/148 |
| 4,169,568 | 10/1979 | Drew et al. | 244/148 |
| 4,577,816 | 3/1986 | Foster | 244/148 |
| 4,577,817 | 3/1986 | Hernandez | 244/148 |
| 4,664,342 | 5/1987 | Jones | 244/149 |
| 4,709,818 | 12/1987 | Spinosa et al. | 244/148 |

OTHER PUBLICATIONS

Daniel F. Poynter, "The Parachute Manual—A Technical Treatise on Aerodynamic Decelerators," Para Publishing, Third Edition, Completely Revised.

Daniel F. Poynter, "The Parachute Manual—A Technical Treatise on Aerodynamic Decelerators," Para Publishing, vol. II, Fourth Edition, Completely Revised.

Military Specification MIL-P-85710(AS), "Parachutes, Personnel, Emergency Escape, General Design Specification For," Department of Defense, Washington, D.C. (Mar. 5, 1986).

Sales Brochure, "Vacuum Packaging," published by H. Koch & Sons.

*Primary Examiner*—David A. Bucci
*Assistant Examiner*—Virna Lissi Ansley
*Attorney, Agent, or Firm*—Kirkland & Ellis

[57] ABSTRACT

An environmentally-sealed parachute deployment system for bail-out parachutes comprising a spring-loaded pilot parachute, an environmentally sealed vacuum bag, a deployment bag having one or two elastic closure loops, and a man-rated parachute. The drag force exerted by the pilot parachute tears open the environmentally sealed bag, initiating deployment of the parachute.

32 Claims, 7 Drawing Sheets

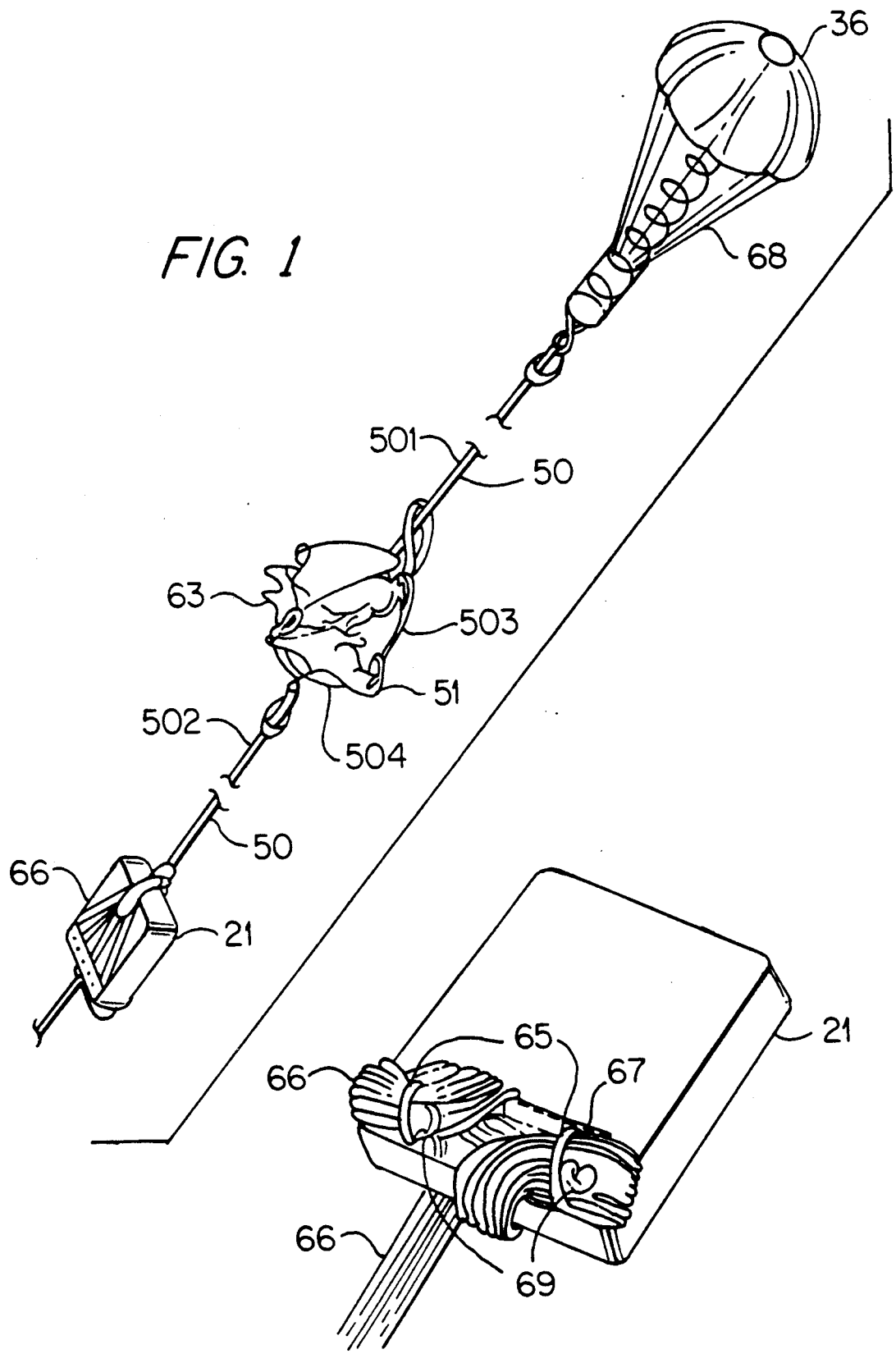

LIGHTWEIGHT SEALED PARACHUTE AND HARNESS ASSEMBLY

The U.S. Government has certain rights in this invention in accordance with the terms of Contract Nos. N00019-87-C-0023 and N60530-90-C-0176, awarded by the Department of the Navy.

FIELD OF THE INVENTION

The present invention relates to bail-out or non-ejection-seat parachutes that are environmentally sealed under vacuum to extend the parachutes, repack cycle and overall useful life. More specifically, the present invention relates to improvements in environmentally sealed parachute systems such that the force generated by a pilot parachute tears open the vacuum bag and initiates deployment of the main parachute even at very low bail-out speeds.

BACKGROUND OF THE INVENTION

Bail-out parachute systems typically comprise a harness, a container, a pilot parachute (the "pilotchute"), and a main parachute. In most modern parachutes, a rip cord is used to pull out a locking pin, allowing a launching spring to eject a pilotchute into the air stream. Once the pilotchute enters the air stream it inflates and pulls the main parachute out. The line attaching the pilotchute to the main parachute is called a "bridle". This bridle is often routed through a deployment device. On some parachutes the deployment device, usually a small bag, will be attached to the pilotchute, but not to the main parachute. These are known as a free bag deployment systems. The deployment device provides stowage for the main canopy and suspension lines, ensuring a more orderly deployment of the parachute, and thus a more reliable parachute deployment system.

Details on the current state of the art on U.S.-manufactured personnel parachutes, their materials, design, construction, repair, and packing may be found in *THE PARACHUTE MANUAL, A Technical Treatise on Aerodynamic Decelerators*, by Daniel F. Poynter, Para Publishing, P.O. Box 4232, Santa Barbara, Calif. 93103-0232 (1984), which is expressly incorporated by reference herein. U.S. military specifications for personnel parachutes are presented in Military Specification MIL-P-85710(AS), *Parachutes, Personnel, Emergency Escape, General Design Specification for*, Department of Defense, Washington, D.C. 20301, Mar. 5, 1986, which is also expressly incorporated by reference herein.

The life of a parachute system is affected by (1) the wear due to the inspection and repack cycle, and (2) the deterioration during service caused by aging of the parachute materials. Materials age because of environmental effects, such as moisture, oxygen, ozone, smog and ultraviolet light, because of wear, and because of the incompatibility of different materials used in constructing the parachute system. For example, the emergency parachute system used most frequently by the Navy is the NB-8 system. The NB-8 system is currently inspected and repacked every 440 days. The typical service life of a nonejection-seat personnel parachute such as the NB-8 is about seven years. On the other hand, vacuum-packed ejection-seat personnel parachutes have demonstrated a service life of up to 20 years. These systems have a proven ability to maintain their package integrity for at least five years even with repeated handling.

The NB-8 system is also heavy and bulky. It weighs over 25 pounds because it uses metal closing cones, metal container opening springs, a spring steel stiffener for the container, and four rip cord pins. When packed, the NB-8 system is about 6 inches thick, and has a volume of about 1,100 cubic inches.

SUMMARY OF THE INVENTION

A parachute is packed in a bag or envelope formed of pliable multilayer materials. Air is evacuated from the bag, and the bag is heat sealed under vacuum. Alternatively, the bag could be sealed with an adhesive. When the parachutist pulls the rip cord, a pilotchute is ejected into the airstream. The drag force exerted by the pilotchute is transmitted by an outer bridle to, for example, four attachment points on the vacuum bag. The drag force rips open the vacuum bag and tears out a section of the bag. An inner bridle connects the outer bridle and the torn-out section of the bag to a deployment bag containing the main parachute. The drag force transmitted down the outer and inner bridle then pulls the deployment bag upwards, as the weight of the parachutist pulls the main parachute out of the deployment bag.

As shown in FIGS. 1-3, the parachute deployment assembly includes a spring-loaded pilotchute 36, a spring 68, a bridle 50, a deployment bag 21, elastic closure loop(s) 65, and suspension lines 66. Elastic closure loop(s) 65 may be a single continuous elastic loop or two separate elastic loops. However, for grammatical convenience the single loop version will be referred to hereinafter. Bridle 50 comprises an outer bridle 501 connecting pilotchute 36 to a tear section 63 (torn from vacuum bag 22, shown empty in FIG. 4a), and an inner bridle 502 connecting tear section 63 from inside the evacuated bag to an, e.g., nylon, deployment bag 21 enclosing the parachute. FIGS. 2 and 3 show how the parachute's suspension lines 66 are routed out of deployment bag 21. Elastic closure loop 65 keeps the deployment bag closed until suspension lines 66 are pulled out of elastic closure loop 65. Elastic closure loop 65 is routed through a channel sewn into the deployment bag, and then through two grommets 69 that are attached to the flap 67 closing the bag, as shown in FIG. 2. The suspension lines 66 near the bottom of the parachute are routed out of deployment bag 21 and folded back on top of flap 67. Suspension lines 66 pass through both ends of elastic loop 65, keeping the ends of the elastic loop above closing flap 67. Thus suspension lines 66 and elastic loop 65 form a locking mechanism holding the bag closed until suspension lines 66 are pulled out of elastic loop 65. When suspension lines 66 are pulled out of elastic loop 65, elastic loop 65 recedes into a channel sewn in the deployment bag. Flap 67 then opens, allowing the deployment bag 21 to be pulled from the main parachute.

Suspension lines 66 suspend the parachutist from the main parachute during a jump. Because suspension lines 66 are too long to be fully stowed on top of closing flap 67, a portion of the suspension lines are arranged on deployment bag 21 in a serpentine arrangement, as shown in FIG. 3. The suspension lines are separated into two equal groups with each group attached to one of two risers 30, as shown in FIG. 3. One of the risers is connected to each side of the harness via special hardware. This hardware is described below, with reference to FIGS. 4b, 6a and 6b. The hardware permits the canopy, suspension lines and risers to be connected to and disconnected from the harness while remaining sealed within the vacuum envelope. FIG. 3 also shows pilot chute bridle attachment strap 70.

The orderly deployment of the main parachute requires a large opening in vacuum bag 22. FIG. 4a is a sketch of vacuum bag 22 attached to outer bridle 501, but before the deployment bag containing the parachute has been placed inside. The seal of vacuum bag 22 extends entirely around the outside of the parachute and the riser hardware. Vacuum bag 22 is also sealed around tear initiation points 51 and vacuum bag attachment points 60. The shaded areas in FIG. 4a show where the vacuum bag is sealed.

The seal of vacuum bag 22 is completed by sealing around the inside eye of the riser interface hardware, with a close fitting bushing 76. The eyes are located at the top end of the vacuum bag, i.e., the end which is positioned next to the top of the harness. FIG. 4b is a cross section of the seal around the riser interface link. This figure shows bushing 76, riser interface link 77 around bushing 76, and riser 30 attached to the riser interface link 77. The vacuum bag is sealed to the bushing at areas 78, as indicated in FIG. 4b. Bushing 76 could be made from any material from which a heat seal may be formed between the bushing and the inner surface of the vacuum bag. For example, if the material on the inner surface of the vacuum bag is low density polyethylene, the bushing could be made from low or medium density polyethylene. A heat seal could then be formed directly between the vacuum bag and the bushing. Holes would then be punched through the vacuum bag inside the bushings. Alternatively, the seal around each bushing may be made with a nonvolatile adhesive. In that case the bushing may be fabricated from a wide range of impermeable materials.

FIG. 4a also shows how outer bridle 501 is split into four legs 503, thus attaching the pilotchute to the vacuum bag. The "X" shape on the vacuum bag is formed by diagonal folds in the vacuum bag. The folds are formed by sealing the interior of the vacuum bag against itself along the lines shown in FIG. 4a. Each leg 503 of the outer bridle is attached to vacuum bag 22 at an attachment point 60 at one end of the "X".

The details of an attachment point (shown as the circle A in FIG. 4a) are shown in greater detail in FIGS. 5a and 5b. Leg 503 of outer bridle 501 loops through a circular seal 72 in the vacuum bag. Circular seal 72 may be reinforced with tape and/or a metal grommet. The vacuum bag is cut within the sealed and folded area to form a tear initiation point 51. Leg 504 of inner bridle 502 is looped through the loop of leg 503 of outer bridle 501. FIG. 5b is a cross section of the attachment point, taken across the line A—A of FIG. 5a. FIG. 5b shows a grommet 75 inside seal 72, and leg 503 of outer bridle 501.

When the parachutist pulls the rip cord, the pilotchute spring is released, ejecting the pilotchute out of the container. Once the pilotchute is in the airstream, it pulls on outer bridle 501, which then pulls on the vacuum bag near the tear initiators, as shown in FIG. 4a. Almost all the area within the tear initiators is torn away, leaving a large opening in the vacuum bag. The pilotchute then pulls further away from the parachutist, and pulls the deployment bag containing the main parachute out of the vacuum bag. Because the deployment bag is pulled out through a large opening in the vacuum bag, extracting the deployment bag requires only a relatively low force.

The deployment bag opens when the drag force exerted by the pilotchute via the bridle pulls the bag upwards, while the parachutist's weight pulls down on the suspension lines. The suspension lines are pulled out of the elastic loop, thus freeing the elastic loop which retracts into a channel sewn in the deployment bag, releasing the flap on the deployment bag, and allowing the bag to open. The upwards force, exerted by the pilotchute on the deployment bag, and the downwards force, exerted by the parachutist on the parachute, combine to pull the parachute completely out of the deployment bag.

The force generated by the pilotchute is designed to be much greater than the force required to tear open the vacuum bag by a very large margin of safety. For example, in the embodiment of the invention described below, only 7 lbs of peak force are required to tear open the vacuum bag. The pilot chute develops a force in excess of 100 lbs. Thus in the worst case, with the pilotchute exactly above the center of the vacuum envelope and the line of force exactly perpendicular to the plane of the four tear initiators, each of the four tear initiators are initially subject to about 25 lbs. However, it is far more likely that the force developed by the pilotchute is applied to one or two of the tear initiation points. After the first tear initiators tear out, the full force is applied to the remaining initiators.

It is an object of the present invention to increase the parachute repack cycle of bail-out parachutes from the present cycle of 440 days to five years or longer, by devising a vacuum-packed system that inhibits aging of the parachute. The packaging system protects the parachute from harmful environmental agents such as moisture, mildew, fungus, ultraviolet light, and smog.

Another object of the present invention is to provide a vacuum-packed parachute container that can be reliably opened by a pilot parachute.

Another object of the present invention is to allow vacuum sealing of either a conventional circular parachute or a parafoil/ram-air type parachute.

It is also an object of the present invention to decrease the total weight of bail-out parachutes.

These and other objects of the present invention will be apparent from the following description and the accompanying drawings of a preferred embodiment of the present invention.

BRIEF DESCRIPTION OF THE DRAWINGS

FIG. 1 is a sketch of the pilotchute and the deployment bag before the parachute is deployed.

FIG. 2 shows how the elastic loop and the parachute suspension lines lock the deployment bag flap closed.

DETAILED DESCRIPTION OF THE INVENTION

Figure 7:
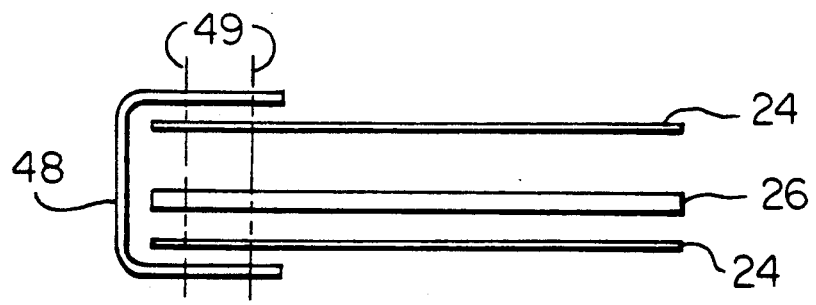
FIG. 7 shows the layers of fabric material in the wall of the parachute container.

A folded parachute (e.g., a ram-air rectangular-shaped gliding parachute, a lightweight circular parachute, or any type of circular canopy including flat, conical, tri-conical or other man-rated parachutes) is placed in a deployment bag 21, vacuum-packed and sealed in a vacuum bag 22, and stowed in a special nylon (or other suitable fabric) double-walled container 23. Vacuum bag 22 is formed of pliable multi-layer materials such as, for example, layers of polyester or nylon, aluminum foil, and low density polyethylene. Container 23 is a double-walled container sewn together with binding tape 48 and stitching 49, as shown in FIG. 7. It comprises two layers of tough flexible nylon fabric 24, and pliable foam padding 26 between the two layers 24.

Figure 6A:
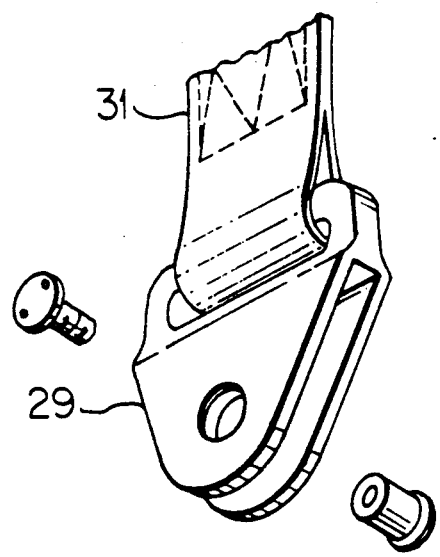
FIGS. 6a and 6b show the connectors used to attach the parachute to the harness.
Figure 6B:
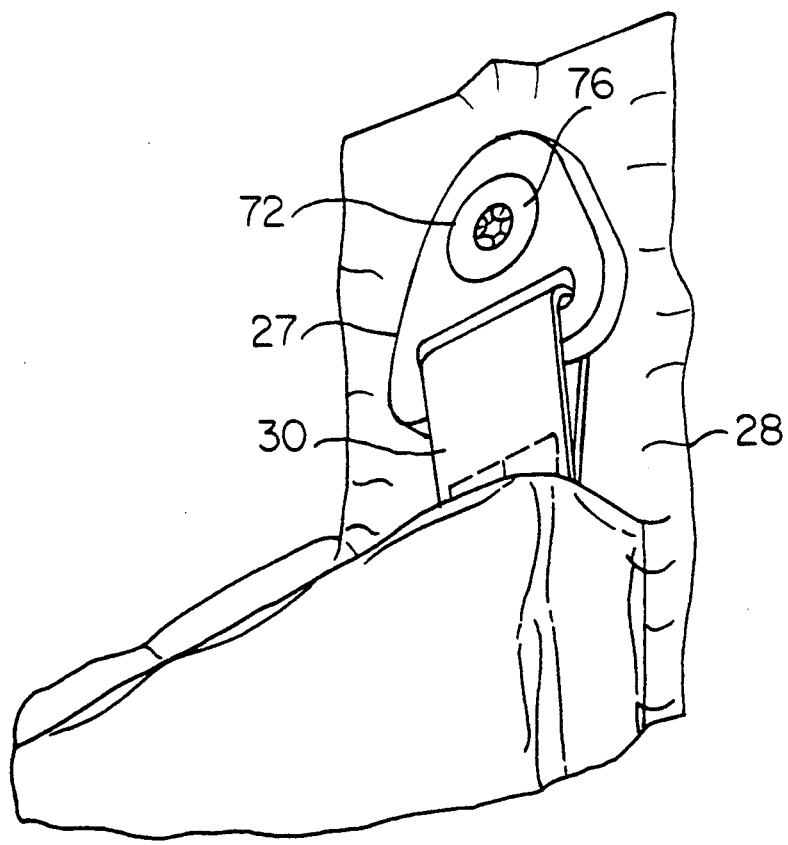

The parachute assembly can be attached to a parachute harness 28 by connectors 27 and 29 (shown in FIGS. 6a and 6b). Connector 27 is a specific embodiment of connector 77 shown in FIG. 4b. As shown in FIGS. 6a and 6b, each pair of connectors 27 and 29 is secured by a bolt inserted in the holes indicated and fastened with a nut, and each connector 27 is attached to a riser 30. Each of the two risers 30 is connected to one of two groups of parachute suspension lines.

Figure 9:
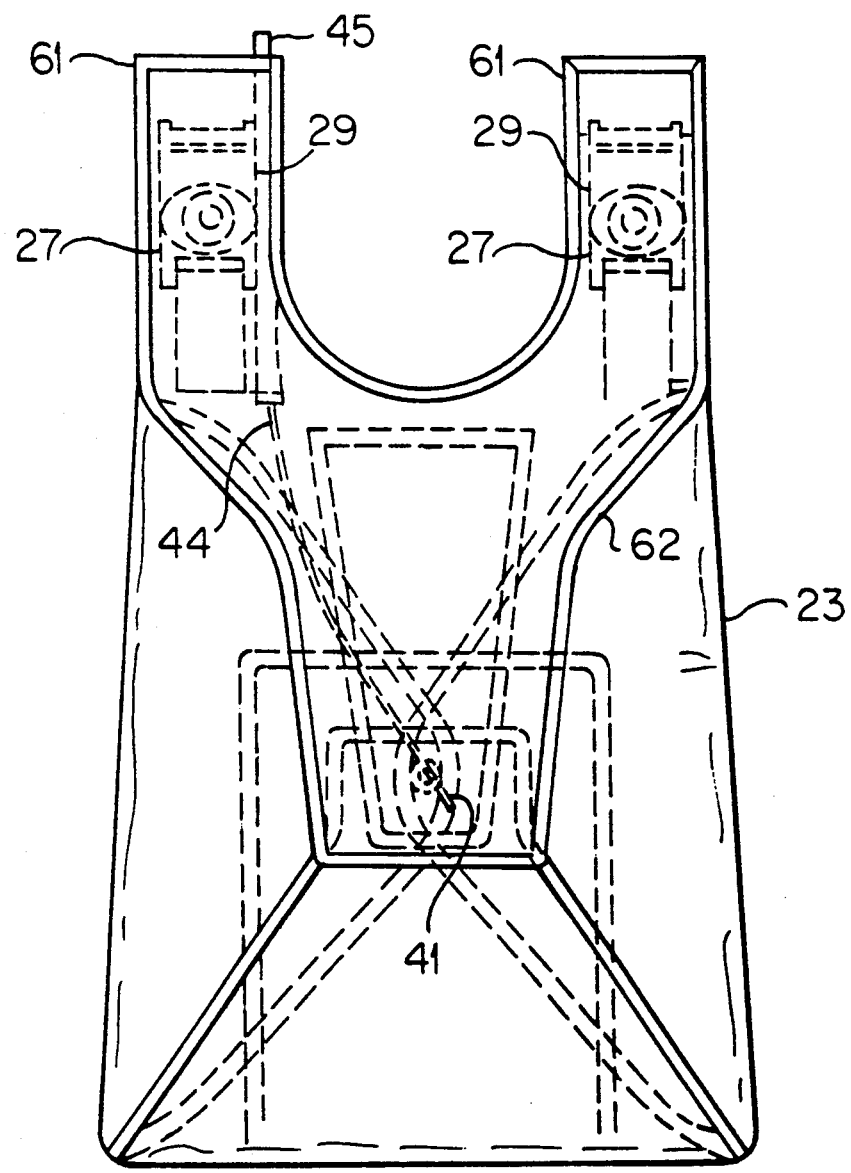
FIG. 9 is a front view of the parachute container.
Figures 8, 10:
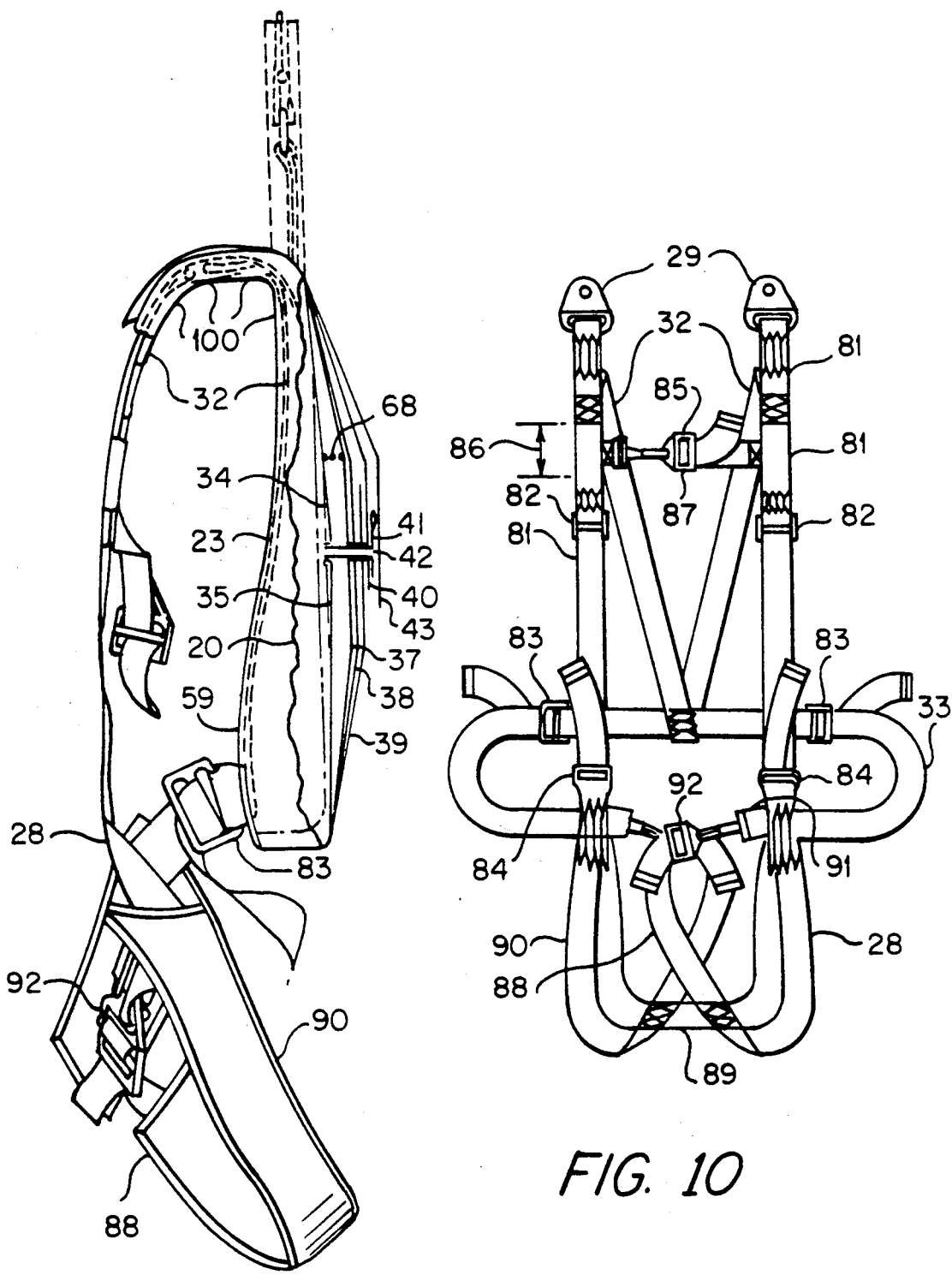
FIG. 8 is a partial cross-section of the environmentally sealed parachute container and harness, showing the integrated harness and the container closing flaps.
FIG. 10 is a sketch of the parachute harness.

Parachute harness 28 is supported on the parachutist's back by harness shoulder straps 32, and lower horizontal back strap 33 as shown in FIGS. 8-10 The top of shoulder straps 32 are sewn to shoulder pads 61 of container 23, shown in FIG. 9, which are closed using hook and loop tape 100 (e.g., VELCRO strips). The rip cord housing 45 containing rip cord 44 passes through the top of one of extensions 61. The back 59 of container 23 rests against the upper back of the parachutist. Pockets may be sewn into harness 28 and container 23 to permit stowage of environmentally sealed survival items such as a radio, a life preserver, and a mini-raft.

The front of container 23 contains several flaps used to close the container and keep its contents in place. FIG. 8 shows the parachute deployment system of the present invention installed in one type of parachute harness. FIG. 8 shows pilotchute positioning flap 34, pilotchute launching flap 35, pilotchute spring 68, left-side flap 37, right-side flap 38, bottom flap 39, top flap 30, and rip cord pin 41. Rip cord pin retainer loop 42 keeps all the flaps closed, except the top cover flap 43, which is closed by VELCRO strips attached to the top surface of top flap 40 and the bottom surface of top cover flap 43. Rip cord pin 41 is attached to rip cord 44, shown in FIG. 9, which passes through rip cord housing 45 and is attached to the rip cord handle in the rip cord handle pocket located in webbing straps 31.

Figure 3:
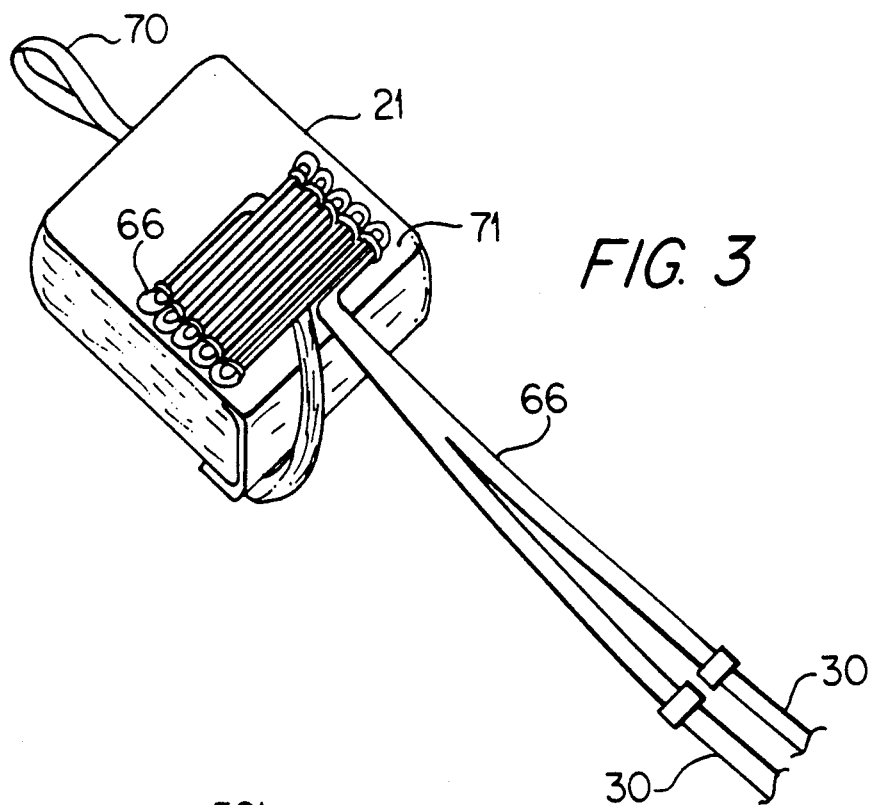
FIG. 3 shows how the parachute suspension lines are routed on the deployment bag.

FIGS. 1-3 show how the parachute is deployed and how the bridle and the suspension lines are routed. Pilotchute 36 is attached to bridle 50 which is attached to deployment bag 21. Suspension lines 66 are routed out of deployment bag 21 and folded on top of closing flap 67. Elastic closure loop 65 is routed through a channel sewn into deployment bag 21, and through two grommets 69 in closing flap 67. Suspension lines 66 pass through both ends of elastic closure loop 65, keeping the ends of loop 65 above closing flap 67. The ends of elastic loop 65 thus pull suspension lines 66 down on closing flap 67, keeping deployment bag 21 closed.

When the parachutist pulls rip cord handle 46 during a jump, rip cord 44 pulls rip cord pin 41 out of its retainer loop 42, and the flaps are pushed open. Spring 68 ejects pilotchute 36 and the outer portion 501 portion of the bridle 50 stowed outside vacuum bag 22 from container 23. Pilotchute 36 opens as it enters the airstream and becomes filled with air. The drag force of pilotchute 36 is transmitted by outer bridle 501 down legs 503 to the four attachment points 60 on vacuum bag 22. The bridle tears tear initiation points 51, shown in FIGS. 4a and 5a, and then pulls out rectangular tear section 63 of the vacuum bag within the four tear initiation points 51 shown in FIG. 4a.

Tear initiation points 51 are small notches cut into sealed areas of the vacuum bag. The material of the vacuum bag is selected to be "notch sensitive." Notch sensitive materials are materials that have good tear strength unless a notch or small cut is made in the material. Once a notch is made, however, a tear can be easily propagated from the notch.

Figure 4A:
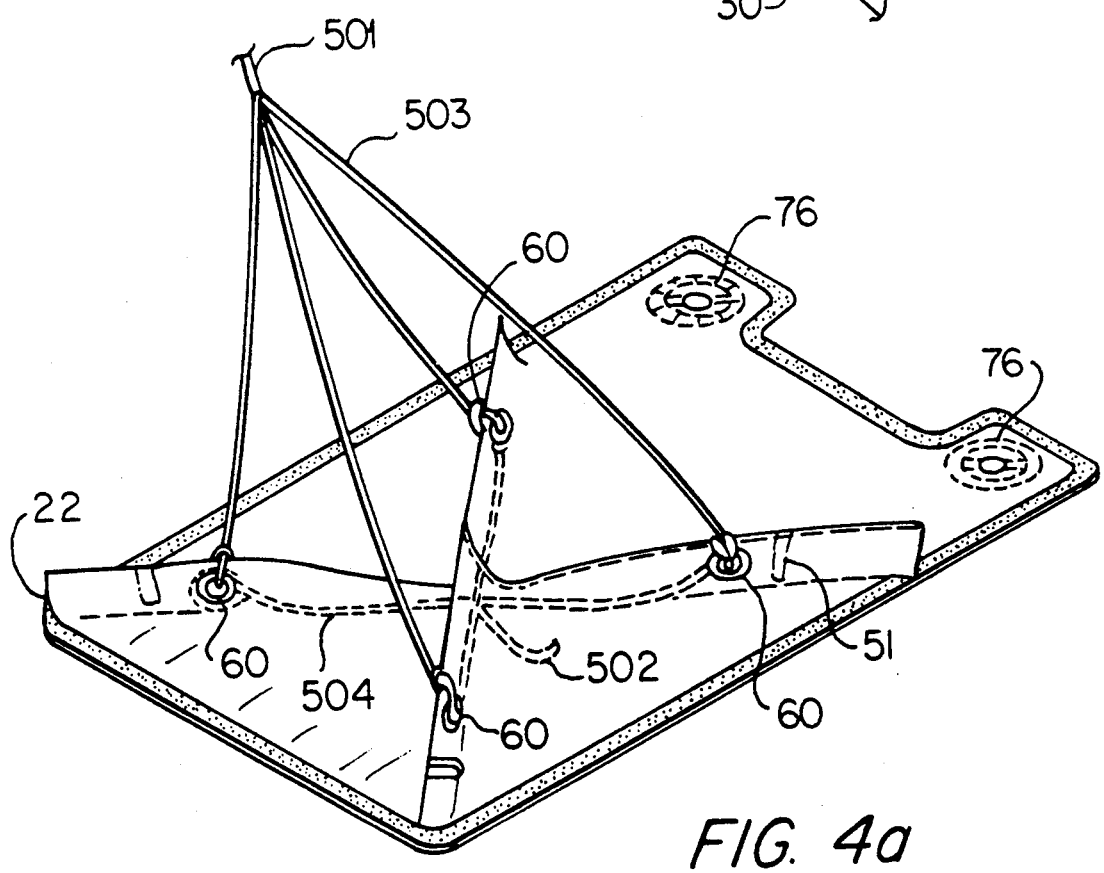
FIG. 4a is a sketch of an empty vacuum bag.
Figure 4B:
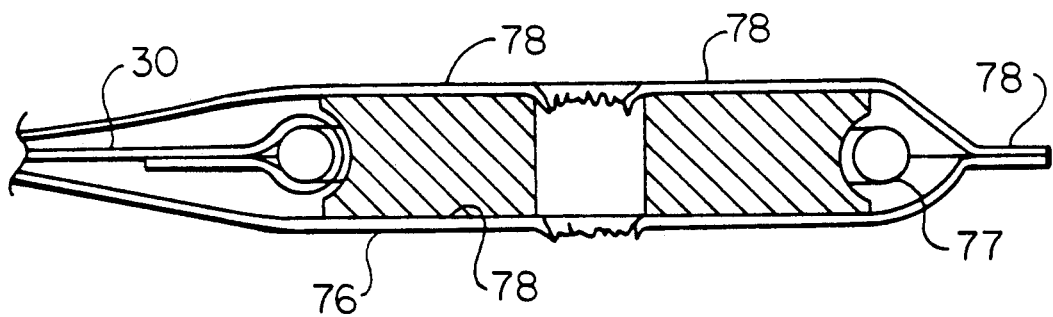
FIG. 4b shows the seal around the eye of a riser.
Figure 5A:
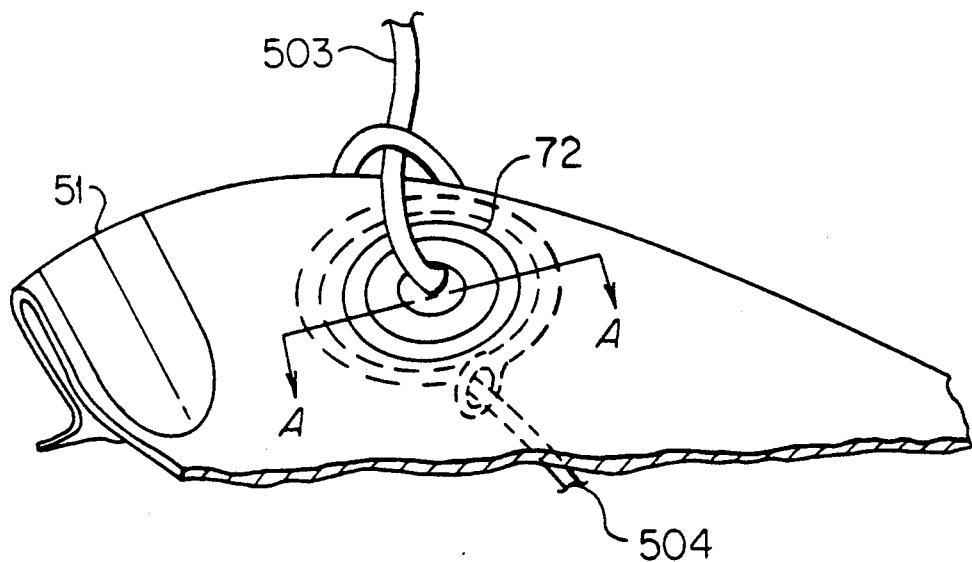
FIG. 5a shows the bridle attachment point in detail.
Figure 5B:
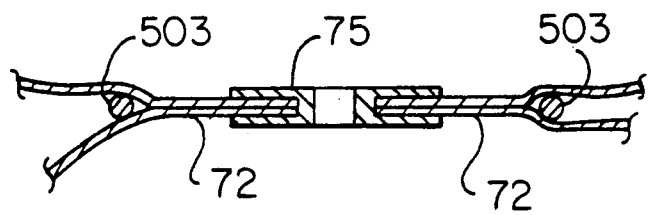
FIG. 5b is a cross section of the bridle attachment point.

FIG. 4a shows how the bridle can be connected to the vacuum bag. In the embodiment shown in FIG. 4a, the bridle is split into four legs, each leg being connected to an attachment point 60 near a tear initiation point 51. The shaded areas in FIG. 4a are heat sealed. The bag is sealed all around its periphery, within the eyes of the riser links, around the tear initiators and around the attachment points 60. FIG. 1 shows the partially deployed parachute system. Pilotchute 36 and the outer portion of bridle 50 have pulled rectangular tear section 63 and deployment bag 21 out of vacuum bag 22 (not shown). The inner portion 502 of bridle 50 is shown in FIG. 1. The inner portion of the bridle comprises four legs 504 connecting the four attachment points 60 to the remaining portion of inner bridle 502.

The inner portion 502 of bridle 50 inside vacuum bag 22 allows the pilotchute and bridle to tear out rectangular section 63 before the force is felt by deployment bag 21. The use of four tear initiators provides redundancy, and also makes the parachute deployment insensitive to the direction from which the pilotchute is pulling.

As the parachutist's weight pulls down on suspension lines 66 and bridle 50 pulls up on deployment bag 21, the suspension lines are pulled off of deployment bag 21 Suspension lines 66 are then pulled out of elastic closure loop 65. Loop 65 then recedes inside the channel in deployment bag 21, allowing closing flap 67 to open and the parachute to be pulled out of deployment bag 21. The parachute opens as it becomes filled with air, and thus safely delivers the parachutist down to earth.

The parachute suspension lines are attached using connectors 27 and 29 to the harness worn by the parachutist, as shown in FIGS. 6a and 6b. Harness 28 can be adjusted to fit the individual parachutist. FIGS. 8-10 are sketches showing parachutes harnesses that can be used with the parachute deployment system of the present invention. FIG. 8 shows a split saddle harness, whereas FIG. 10 shows a full saddle harness. As shown in FIG. 10, connectors 29 attach the risers 30 to main lift straps 81 and shoulder straps 32. Shoulder straps 32 are sewn to each other and to horizontal back strap 33 at the center of horizontal back strap 33. Horizontal back strap 33 is also sewn to container 23, near the bottom. The length of the harness can be adjusted by adjusting the main lift straps 8 using links 82. Horizontal back strap 33, leg straps 88 and chest strap 87 can be adjusted using adjusters 83, 92 and 85, respectively. The position of the chest strap can be adjusted over a range of about 2 inches for the comfort of female parachutists, as indicated by the range shown in FIG. 10 for the attachment point 86 of chest strap 87. The saddle straps 90 and 88 are sewn together side by side to form a broad seat for supporting the buttocks. The two leg straps 88 are brought up between the legs and connected via quick ejector clips 91 back to the main lift web. The left leg strap is connected to the left side of the harness and the right leg strap to the right side of the harness. The straps on the adjustable "V" rings are pulled snug to form close fitting loops that hold saddle strap 89 snugly under the buttocks.

Figure 11:
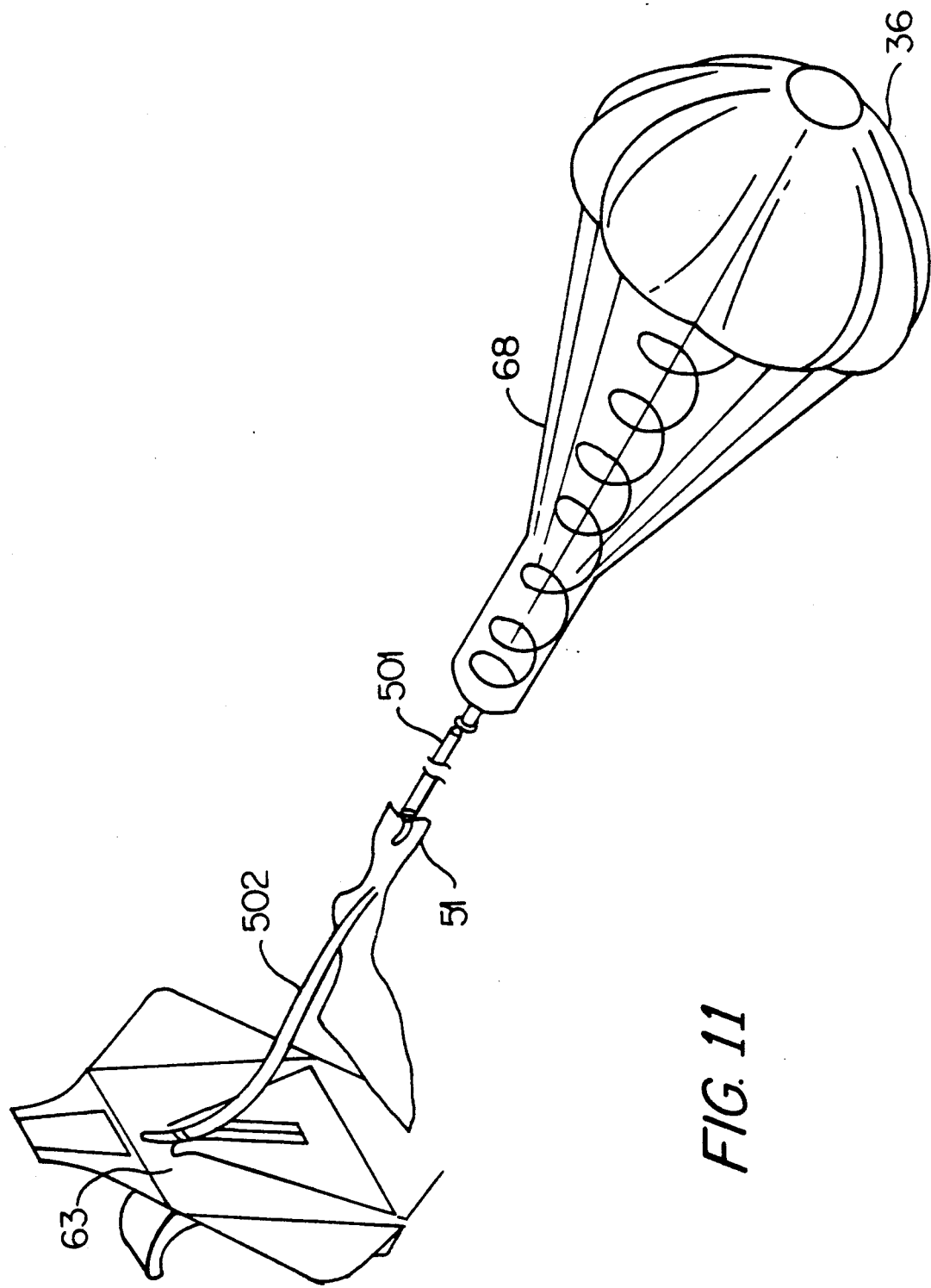
FIG. 11 is a sketch of a pilotchute pulling a triangular tear section out of the vacuum bag.

The main embodiment described herein uses a rectangular tear section 63. However, tear section 63 need not necessarily be rectangular. For example, triangular, pentagonal, hexagonal, septagonal or octagonal tear sections may be used. If a triangular tear section is used, Y-shaped folds in the vacuum bag would be used instead of the X-shaped fold described above, and the outer bridle could be split into three legs. Alternatively, the bridle may be attached near one vertex of the triangle, so that vertex tears first, as shown in FIG. 11. The tear would then propagate down the sides of the triangle along frangible tear lines in vacuum bag 22 to the other two vertices.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An environmentally sealed bail-out parachute system comprising:
   (a) a pilotchute in a container;
   (b) means for ejecting the pilotchute out of the container;
   (c) an environmentally sealed vacuum bag in the container, said vacuum bag having at least three tear initiation points;
   (d) a deployment bag containing a main parachute environmentally sealed inside the vacuum bag, said main parachute having suspension lines;
   (e) an outer bridle connecting the pilotchute to attachment points on the vacuum bag positioned next to and inside of each tear initiation point, such that when the pilotchute is ejected into the airstream during a jump, the force exerted by the outer bridle tears the vacuum bag at the tear initiation points, the tears propagate from the tear initiation points until the tear lines intersect and a section of the vacuum bag is torn completely out of the vacuum bag; and
   (f) an inner bridle connecting the outer bridle to the deployment bag, such that the pilotchute, the outer bridle and the inner bridle pull the deployment bag out of the vacuum bag after the vacuum bag is torn open;
   wherein after the deployment bag is pulled out of the vacuum bag, the suspension lines pull the main parachute out of the deployment bag.

2. The environmentally sealed parachute system of claim 1, wherein the deployment bag comprises a closing flap holding the main parachute inside the deployment bag, and the closing flap is held closed by at least one elastic loop holding the parachute's suspension lines against the closing flap, such that when the suspension lines are pulled out of the at least one elastic loop, the closing flap opens and the parachute is pulled out of the deployment bag.

3. The environmentally sealed parachute system of claim 2, wherein the vacuum bag has four tear initiation points, and the section torn out of the vacuum bag is rectangular.

4. The environmentally sealed parachute system of claim 2, wherein the at least one elastic loop recedes inside a channel sewn into the deployment bag when the suspension lines are pulled out of the at least one elastic loop.

5. The environmentally sealed parachute system of claim 2, wherein the suspension lines are stowed against an outside surface of the deployment bag in a serpentine arrangement.

6. The environmentally sealed parachute system of claim 1, wherein the vacuum bag has four tear initiation points, and the section torn out of the vacuum bag is rectangular.

7. The environmentally sealed parachute system of claim 1, wherein the vacuum bag is fabricated from notch sensitive materials.

8. The environmentally sealed parachute system of claim 7, wherein the attachment points comprise folds in the vacuum bag formed by sealing the interior of each fold against itself and then making a hole through each seal.

9. The environmentally sealed parachute system of claim 8, wherein the seals are circular seals, a grommet is affixed concentric to each circular seal and the hole is in the approximate center of the grommet.

10. The environmentally sealed parachute system of claim 8, wherein the outer bridle loops through the hole, and the inner bridle loops around the hole, such that the outer bridle and the inner bridle loop through each other.

11. The environmentally sealed parachute system of claim 1, wherein the vacuum bag has a top harness end and a main portion, the attachment points being located in the main portion of the vacuum bag, but no attachment points being located near the top harness end of the vacuum bag, and wherein the vacuum bag comprises two eyes located at the top harness end of the vacuum bag, each of said eyes comprising a bushing inside the vacuum bag, the inner surfaces of the vacuum bag being sealed against said bushing, with a hole through the vacuum bag and through the center of the bushing forming the eye, wherein the suspension lines are divided into equal groups, each group being attached to one eye by a metal ring around the bushing.

12. The environmentally sealed parachute system of claim 11, wherein a harness may be connected to the suspension lines by attaching the harness to the eyes in the vacuum bag.

13. The environmentally sealed parachute system of claim 1, further comprising a harness having shoulder straps, a chest strap, leg straps and saddle straps.

14. The environmentally sealed parachute system of claim 13, wherein the position of the chest strap may be adjusted up or down.

15. An environmentally sealed bail-out parachute system comprising:
   (a) a pilotchute in a container;
   (b) means for ejecting the pilotchute out of the container;

(c) an environmentally sealed vacuum bag in the container;

(d) a deployment bag containing a main parachute environmentally sealed inside the vacuum bag, said main parachute having suspension lines;

(e) an outer bridle connecting the pilotchute to the vacuum bag, such that when the pilotchute is ejected into the airstream during a jump, the force exerted by the outer bridle tears open the vacuum bag;

(f) an inner bridle connecting the outer bridle to the deployment bag, such that the pilotchute, the outer bridle and the inner bridle pull the deployment bag out of the vacuum bag after the vacuum bag is torn open;

wherein the deployment bag comprises a closing flap holding the main parachute inside the deployment bag, and the closing flap is held closed by at least one elastic loop holding the parachute's suspension lines against the closing flap, such that when the suspension lines are pulled out of the at least one elastic loop, the closing flap opens and the parachute is pulled out of the deployment bag.

16. The environmentally sealed parachute system of claim 15, wherein the at least one elastic loop recedes inside a channel sewn into the deployment bag when the suspension lines are pulled out of the at least one elastic loop.

17. The environmentally sealed parachute system of claim 16, wherein the suspension lines are stowed against an outside surface of the deployment bag in a serpentine arrangement.

18. The environmentally sealed parachute system of claim 15, wherein the vacuum bag comprises two eyes located at one end of the vacuum bag, each of said eyes comprising a bushing inside the vacuum bag, the inner surfaces of the vacuum bag being sealed against said bushing, with a hole through the vacuum bag and through the center of the bushing forming the eye, wherein the suspension lines are divided into two equal groups, each group being attached to one eye.

19. The environmentally sealed parachute system of claim 18, wherein a harness may be connected to the suspension lines by attaching the harness to the eyes in the vacuum bag.

20. The environmentally sealed parachute system of claim 1, further comprising a harness having shoulder straps, a chest strap, leg straps and saddle straps.

21. An environmentally sealed bail-out parachute system comprising:
   (a) a pilotchute in a container;
   (b) means for ejecting the pilotchute out of the container;
   (c) an environmentally sealed vacuum bag in the container comprising two eyes located at one end of the vacuum bag, each of said eyes comprising a bushing inside the vacuum bag, the inner surfaces of the vacuum bag being sealed against said bushing, and a hole being punched through the vacuum bag through the center of the bushing to form the eye;
   (d) a deployment bag containing a main parachute environmentally sealed inside the vacuum bag, said main parachute having suspension lines, wherein the suspension lines are divided into equal groups, each group being attached to one eye of the vacuum bag;
   (e) an outer bridle connecting the pilotchute to the vacuum bag such that when the pilotchute is ejected into the airstream during a jump, the force exerted by the outer bridle tears the vacuum bag open; and
   (f) an inner bridle connecting the outer bridle to the deployment bag, such that the pilotchute, the outer bridle and the inner bridle pull the deployment bag out of the vacuum bag after the vacuum bag is torn open and the suspension lines pull the main parachute out of the deployment bag.

22. The environmentally sealed parachute system of claim 21, wherein a harness may be connected to the suspension lines by attaching the harness to the eyes in the vacuum bag.

23. The environmentally sealed parachute system of claim 21, further comprising a harness having shoulder straps, a chest strap, leg straps and saddle straps.

24. The environmentally sealed parachute system of claim 23, wherein the position of the chest strap may be adjusted up or down.

25. An environmentally sealed bail-out parachute system comprising:
   (a) a pilotchute in a container;
   (b) means for ejecting the pilotchute out of the container;
   (c) an environmentally sealed vacuum bag in the container, said vacuum bag comprising one tear initiation point and two frangible tear lines extending from the tear initiation point, forming a triangular tear section;
   (d) a deployment bag containing a main parachute environmentally sealed inside the vacuum bag, said main parachute having suspension lines;
   (e) an outer bridle connecting the pilotchute to an attachment point on the vacuum bag positioned next to and inside the tear initiation point, such that when the pilotchute is ejected into the airstream during a jump, the force exerted by the outer bridle tears the vacuum bag at the tear initiation point, the tears propagate from the tear initiation point along the frangible tear lines until the triangular tear section of the vacuum bag is torn completely out of the vacuum bag; and
   (f) an inner bridle connecting the outer bridle to the deployment bag, such that the pilotchute, the outer bridle and the inner bridle pull the deployment bag out of the vacuum bag after the vacuum bag is torn open;

wherein after the deployment bag is pulled out of the vacuum bag, the suspension lines pull the main parachute out of the deployment bag.

26. The environmentally sealed parachute system of claim 25, wherein the deployment bag comprises a closing flap holding the main parachute inside the deployment bag, and the closing flap is held closed by at least one elastic loop holding the parachute's suspension lines against the closing flap, such that when the suspension lines are pulled out of the at least one elastic loop, the closing flap opens and the parachute is pulled out of the deployment bag.

27. The environmentally sealed parachute system of claim 25, wherein the vacuum bag is fabricated from notch sensitive materials.

28. The environmentally sealed parachute system of claim 25, wherein the vacuum bag has a top harness end, and the vacuum bag comprises two eyes located at the top harness end of the vacuum bag, each of said eyes comprising a bushing inside the vacuum bag, the inner surfaces of the vacuum bag being sealed against said bushing, with a hole through the vacuum bag and through the center of the bushing forming the eye, wherein the suspension lines are divided into equal groups, each group being attached to one eye.

29. The environmentally sealed parachute system of claim 28, wherein a harness may be connected to the suspension lines by attaching the harness to the eyes in the vacuum bag.

30. The environmentally sealed parachute system of claim 25, further comprising a harness having shoulder straps, a chest strap, leg straps and saddle straps.

31. The environmentally sealed parachute system of claim 30, wherein the position of the chest strap may be adjusted up or down.

32. The environmentally sealed parachute system of claim 25, wherein the frangible tear lines are of equal length such that the triangular tear section is an isosceles triangle.

* * * * *